Patented May 11, 1948

2,441,320

UNITED STATES PATENT OFFICE 2,441,320

ORGANO-SILOXANES AND METHODS OF MAKING THEM

James Franklin Hyde, Corning, N. Y., assignor to Corning Glass Works, Corning, N. Y., a corporation of New York No Drawing. Application March 20, 1944, Serial No. 527,348

9 Claims. (Cl. 260—46.5)

This invention relates to new compositions of matter and their preparation and, more particularly, to organo-siloxanes and methods of preparing them.

The present application is a continuation-in-part of my co-pending applications Serial Number 432,528, filed February 26, 1942, Serial Number 467,146, filed November 27, 1942, and Serial Number 483,450 filed April 17, 1943, all assigned to the assignee of the present invention.

Mono-silanes of the formula $SiX_4$, where X is a hydrolyzable radical, such as halogen, acyloxy, alkoxy, hydrogen, etc., do not yield simple hydroxy compounds upon being hydrolyzed but produce instead brittle, insoluble, infusible siliceous solids comprising a three dimensional network of structural units composed of siloxane linkages as a result of the concurrent or subsequent loss of water from the intermediately formed hydroxy compound.

Type I

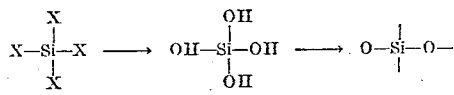

The formation of a siloxane linkage generally results from the close approach of two hydroxyl groups and subsequent elimination of water. It may also result from the close approach of one hydroxyl group to a hydrolyzable group such as halogen, acyloxy or alkoxy and subsequent elimination of hydrogen halide, carboxylic acid or alcohol, respectively. Such eliminations are catalyzed by mineral acids, especially hydrochloric and sulphuric and by alkali metal hydroxides, especially sodium hydroxide. It is apparent that, in the formation of such a rigid structure, many hydroxyl groups become isolated and block some of the possible cross linkages. As the structural network becomes more complicated, dehydration becomes increasingly more difficult, and the result is a partially dehydrated siliceous mass of poor dimensional stability.

Organo-substituted silanes of the formula $RR'R''SiY$ are prepared by means of the well-known Grignard reaction, where R, R' and R'' may be any organic radical which is capable of reacting with magnesium to form a Grignard reagent and which is attached to silicon through a carbon atom, and Y is any hydrolyzable radical such as hydrogen, halogen, alkoxy, aroxy, acyloxy, etc. By hydrolyzable radical is meant, in general, any radical which is attached to silicon by other than carbon-silicon linkage and which under the same set of conditions is more readily hydrolyzed than an organic radical directly attached to silicon through carbon-silicon linkage. Such organo-substituted silanes, when hydrolyzed and dehydrated, yield simple oxides in the structural unit of which three of the four silicon bonds are blocked by the organic radicals R, R' and R''.

Type II

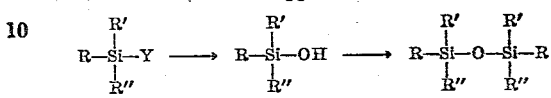

In this case, ease of hydrolysis is further diminished and in some cases the intermediate hydroxy silicanes can be isolated. The completely dehydrated product is dimeric because only one siloxane linkage can be formed. The dimers are either crystalline or liquid.

Prior attempts to utilize the above-described reactions have not contemplated combinations thereof, but have been confined more or less to the individual reactions and their products. Such products, as shown above, have limited utility and the range of properties obtainable in the products of a given type of reaction is relatively restricted. For example, the product resulting from Type I reaction is an insoluble, infusible silicic acid of little utility; Type II reaction yields generally inert liquid products which, although they are soluble in organic solvents, cannot be polymerized beyond the dimer and hence cannot be utilized per se for coating compositions, resinous impregnants and the like.

An object of this invention is the production of new and useful products from these reactions which will have desirable predetermined properties.

Another object of this invention is to combine the above-described reactions and thus to hydrolyze and condense mixtures of tri-organo-substituted and non-organo-substituted silanes.

A still further object of the present invention is to prepare organo-siloxanes which contain only silicon atoms having three organic radicals attached thereto through carbon-silicon linkage and silicon atoms having no organic radicals attached thereto through carbon-silicon linkages.

The new method comprises mixing at least one monosilane of the general formula $SiX_4$ with at least one monosilane of the formula

where R, R', and R'' are the same or different organic radicals and X and Y are the same or different hydrolyzable radicals, and causing them to hydrolyze together and to become inter-condensed. It is to be understood that each of the silanes is present in appreciable quantities, i. e. in amount sufficient to produce a perceptible effect on the properties of the resulting inter-condensate. It is preferred to employ said mono-silanes in the molar proportions of at least 2 of the type RR'R''SiY per 3 of the type SiX₄, but not more than 4 of the former per one of the latter. One method of accomplishing inter-condensation is by introducing into the mixture by dropwise addition thereto the amount of water which is calculated for complete hydrolysis of the mixture and which preferably is dissolved in from two to four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a water-miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put.

In a mixture comprising at least one silane having four hydrolyzable radicals attached to each silicon atom and at least one silane having three organic radicals and one hydrolyzable radical attached to each silicon atom, hydrolysis and dehydration by my method will result in inter-condensation or formation of inter-connecting oxygen linkages between the silicon atoms of the various silanes. The variety of the substituted organic radicals is limited only by their ability to form a Grignard reagent. The radicals which may thus be substituted may include alkyl radicals such as methyl, ethyl, propyl, isopropyl, butyl, isobutyl, amyl, hexyl, heptyl to octadecyl and higher; alicyclic radicals such as cyclopentyl, cyclohexyl, etc.; aryl and alkaryl radicals, such as phenyl, mono- and poly-alkyl phenyls, as tolyl, xylyl, mesityl, mono-, di- and tri-ethyl phenyls, mono-, di- and tri-propyl phenyls, etc.; naphthyl, mono- and poly-alkyl naphthyls, as methyl naphthyl, diethyl naphthyl, tri-propyl naphthyl, etc.; tetra-hydronaphthyl; anthracyl, etc.; aralkyl such as benzyl, phenylethyl, etc.; alkenyl such as methallyl, allyl, etc. The above radicals may contain inorganic substituents such as halogens, etc.

If the hydrolyzable group or groups of all of the silanes in the mixture to be hydrolyzed are halogens, it is preferable to employ dioxan as the solvent because it is inert to the halogens. If the mixture contains both halogens and alkoxy groups the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as HCl as catalyst. In this case, alcohol may be preferred on account of its relatively low cost. Mixtures of water miscible solvents may be used.

In the above-described method, the slow incorporation of water into the homogeneous solution insures that hydrolysis is not permitted to proceed unchecked, whereby the more reactive silane or silanes, would be more completely hydrolyzed and condensed before the less reactive silanes have had an opportunity to react. On the contrary, the less reactive silanes are thus given a greater opportunity to hydrolyze simultaneously with the more reactive silanes than would be the case if the hydrolysis were conducted rapidly. Under these circumstances, simultaneous condensation of the various intermediate hydroxy compounds takes place and an intimate inter-molecular combination through siloxane linkages of silicon atoms bearing different numbers and kinds of organic radicals becomes possible to the fullest extent. This insures a true inter-condensation with the formation of homogeneous products containing mixed unit structures.

After removal of solvent and excess water the hydrolysis products resulting from the above process are water-miscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number of siloxane linkages per molecule and the disposition of the siloxane linkages, this being controlled by the relative amounts of the various types of silanes initially present.

The partially dehydrated organo-siloxanes or hydrolysis products, after removal of solvents, vary in the extent to which dehydration has occurred at this stage. The ease of dehydration and the physical properties of the organo-siloxanes vary with the kind of substituted organic radicals and with their number or with the final ratio of oxygen to silicon. Subsequent heating is usually necessary for complete dehydration, particularly when the oxygen to silicon ratio is greater than one. The extent of heating necessary depends upon the ease of dehydration which in turn depends upon the molecular size of the organic radical or radicals present and the number of possible siloxane linkages, that is, the final oxygen to silicon ratio. Products containing methyl radicals dehydrate more readily than those containing ethyl, propyl, etc., radicals or phenyl radicals and in general products containing alkyl radicals dehydrate more readily than those containing aryl radicals. Ease of dehydration also increases as the number of radicals per silicon atom increases or as the final oxygen to silicon ratio dereases. When this ratio is less than one, the organo-siloxanes are oils of relatively low viscosity. Their volatility decreases with increasing molecular size of the radicals and at the same time the viscosity may increase somewhat. As the final oxygen to silicon ratio increases from 1.0 to 1.3, there is a corresponding increase in molecular complexity or the number of siloxane linkages and an accompanying increase in viscosity. When the ratio is in the neighborhood of 1.3 and aryl radicals predominate, the viscosity increases to such an extent that the organo-siloxanes are thermoplastic solids which may be fused and solidified repeatedly by heating and cooling. As the oxygen to silicon ratio is increased to the neighborhood of 1.5 and beyond (approaching 2), the organo-siloxanes tend to become thermosetting and more particularly if the molecular size of the radicals is decreased.

Thus it will be seen that uniformity of behavior not only makes possible a wide variation in properties of the compositions, including viscosity, vapor pressure, melting range, setting rate, hardness, toughness, etc., but it also enables one to predict the most suitable combination of intermediate compounds for the production of an organo-siloxane for the desired purpose.

The organo-siloxanes which are produced by my method may be represented as combinations of the units

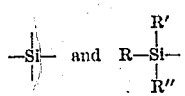

bearing in mind that these units are chemically combined with each other by siloxane linkages, that the percentage of each unit may be varied at will, and that the properties of the resulting products will show corresponding variation which can be predicted in making compositions for a particular purpose.

The following examples will illustrate the mode of operation of the process and the character of the resulting products.

*Example 1*

Two molar parts of $(C_6H_5)(CH_3)_2SiCl$ and one of $SiCl_4$ were mixed and diluted with two volumes of dioxane. This solution was then added dropwise to a solution of one part by volume of water in three parts of dioxane. On evaporation a viscous oil remained in which some free silica was suspended. In comparison, two molecular parts of $(C_6H_5)(CH_3)_2SiCl$ was esterified by dropping in alcohol. One part of $Si(OC_2H_5)_4$ was then added and the mixture treated dropwise with water. The product was a homogeneous viscous oil which remained unchanged on heating for half an hour at 180° C.

*Example 2*

$SiCl_4$ and $(C_6H_5)(CH_3)_2SiCl$ were mixed in the molar ratio 1:3. After dilution with two volumes of dioxane, aqueous dioxane was added with great care. In spite of precautions a considerable amount of silica precipitated out showing clearly that satisfactory inter-condensation had not occurred. On evaporation, however, the liquid portion was somewhat more viscous than the oil obtained from $(C_6H_5)(CH_3)_2SiCl$ alone. This behavior is undoubtedly due to the wide difference in reactivity of the $SiCl_4$ and the trisubstituted halide.

To avoid this difficulty a mixture of halides of the same composition was again diluted with dioxane. To this mixture glacial acetic acid was then added. There was no sign of precipitation. Some HCl was evolved after adding a volume of glacial acetic acid approximately equal to the original halide mixture and warming gently; another volume of aqueous acetic acid (1:3) was added with further warming. On evaporation of solvent an oil of medium viscosity resulted. This oil showed no tendency to body or change with heating at 180° C. for 20 hours.

*Example 3*

A mixture of $SiCl_4$ and $(C_6H_5)(CH_3)_2SiCl$ in the molecular ratio 5:8 was diluted with an equal volume of dioxane. Another volume of glacial acetic acid was added. Another volume of aqueous acetic acid (1:3) was added dropwise with warming. The solvent was then evaporated in vacuo leaving a medium viscosity liquid, which became slightly more viscous after two hours at 190° C.

*Example 4*

To a solution of $(C_6H_5)(CH_3)_2Si(OC_2H_5)$ and $Si(OC_2H_5)_4$ in the molar proportions 2:1, 95% ethyl alcohol containing a few drops of concentrated hydrochloric acid was added slowly with warming to effect hydrolysis and inter-condensation. Water was then added in excess to carry the reaction to completion. After evaporating off the solvents a slightly viscous liquid was obtained. A sample applied to a glass plate and heated at 190° C. for seventy-two hours remained quite tacky.

*Example 5*

To a mixture of two molar parts of $$(C_6H_5)(CH_3)_2SiCl$$

and one molar part of ethylorthosilicate was slowly added more than the theoretical amount of water required to effect complete hydrolysis. The alcohol produced as a by-product and residual water were removed at room temperature by suction. A low viscosity fluid was obtained which increased only slightly in viscosity after 12 hours at 250° C.

*Example 6*

Phenyldimethylethoxysilane and ethylorthosilicate were mixed in the molar proportions of four to one. A dilute solution of aqueous alcoholic hydrochloric acid containing more than the theoretical amount of water required to completely hydrolyze the silanes was added slowly to the mixture. The alcohol and water were removed at completion of the addition of water by heating slightly above 100° C. A liquid of low viscosity remained. This liquid had a viscosity of 7 centistokes at 24° C. and 1.8 centistokes at 100° C.

*Example 7*

Phenyldimethylethoxysilane and ethylorthosilicate were mixed in the molar proportions of two to three. The mixture was hydrolyzed by slowly adding a dilute aqueous alcoholic solution of hydrochloric acid containing more than the theoretical amount of water required to completely hydrolyze the silanes. When the addition was completed the alcohol and residual water were evaporated by heating. A viscous liquid was left which set to a resinous solid after 10 hours at 250° C.

*Example 8*

Trimethylethoxysilane and ethylorthosilicate were mixed in equimolecular proportions. To the stirred mixture was slowly added excess water in two volumes of alcohol. The mixture was warmed slightly during the addition of the water. At the end of the addition, the alcohol and water were removed at room temperature by suction. The product was a viscous liquid which set to a resinous solid after 2½ hours at 250° C.

Example 9

A mixture of $(CH_3)_3Si(OC_2H_5)$ and $$Si(OC_2H_5)_4$$

in the molar proportions of 1.75 to 1 was hydrolyzed and treated in the same manner as the mixture in Example 8. A liquid of medium viscosity was obtained which required 17 hours of blowing with air at 210 to 240° C. before it gelled.

As has been pointed out, it is possible to predict the general properties of the inter-condensates on the basis of the oxygen/silicon ratio and the secondary effect of the size of the organic radicals. However, in all organo-silicon compounds the thermal stability of the carbon-silicon linkage varies with the kind of radical. It is necessary to take this into account when considering uses for organo-siloxanes. In general, there is a decrease in thermal stability with increase in size of aliphatic radicals. This is clearly shown by comparison of the thermal behavior of organo-siloxanes containing methyl radicals with those containing dodecyl radicals. The compositions containing allyl, methallyl, benzyl and $\beta$-phenylethyl radicals, are relatively less stable than compositions containing such radicals as phenyl, methyl, ethyl, etc. Therefore, certain temperature limitations are encountered in their uses.

It will be seen that the inter-condensates produced by my method are not mixtures of individual organic-siloxanes but are new compounds differing therefrom in homogeneity of structure and properties. It will further be seen that the new organo-siloxanes may contain various different radicals attached to the same silicon atom and the individual silicon atoms may differ in the number and kind of radicals attached thereto in which respect the new siloxanes differ from previous siloxanes where each silicon atom was attached to the same kind of radicals. Such differences result in new compounds or intercondensates which embody various improvements over previous organo-siloxanes with respect to temperature coefficient of change of viscosity, thermal resistivity, chemical stability, electrical properties, etc.

The organo-siloxanes produced by my method may be adapted to various uses and for any specific use the physical properties and characteristics of the product can be controlled by the proper selection of the initial starting materials so as to obtain the desired oxygen to silicon ratio and a suitable variety of radicals attached to the silicon atom. Products which remain liquid with little or no tendency for further polymerization even at elevated temperatures include products having an oxygen to silicon ratio between 0.5 and 1.0 and particularly those containing lower alkyl radicals. Such products have good electrical properties whereby they may be used as the liquid filling medium for transformers, circuit breakers, submarine cables, condensers, etc. In general these products have an unusually low coefficient of change of viscosity with temperature and may find use in hydraulic pressure systems which are subjected to wide changes of temperatures or as lubricants for systems of moving parts operating under subnormal or abnormal temperatures.

More viscous liquid products such as those wherein the oxygen to silicon ratio lies in the neighborhood of 1.0 or more may also be used for lubricants and are particularly useful as damping media in delicate instruments and the like.

Thermoplastic and thermosetting products having an oxygen-silicon ratio usually greater than 1.0 are useful as molding compounds, film forming coatings, varnishes, impregnating agents for electrical insulation and the like. They may be applied as solutions of the incompletely condensed organo-siloxanes and after evaporation of the solvent can be further polymerized in situ. The more brittle products should be useful embedding media for condenser plates as well as molding compounds. Such products usually have an oxygen-silicon ratio of 1.5 or greater and may be thermoset in situ by heat.

I claim:

1. The method which comprises concurrently hydrolyzing the components of a mixture consisting of a monosilane having three monovalent hydrocarbon radicals attached to each silicon atom through carbon-silicon linkages, the remaining valence of each silicon atom being satisfied by a hydrolyzable radical selected from the class consisting of halogens and alkoxy radicals and a mono-silane having four hydrolyzable radicals selected from the class consisting of halogen and alkoxy radicals attached to each silicon atom, said mono-silanes being in the molar proportion of at least 2 of the former to 3 of the latter, but not more than 4 of the former to 1 of the latter, dehydrating the hydrolysis products, and recovering the organo-siloxane thereby produced.

2. The method according to claim 1, in which the three monovalent hydrocarbon radicals attached to each silicon atom of the first stated monosilane are methyl radicals.

3. The method which comprises forming a mixture of silanes consisting of a mono-silane having three monovalent hydrocarbon radicals attached to each silicon atom through carbon-silicon linkages, the remaining valence of each silicon atom being satisfied by a hydrolizable radical selected from the class consisting of halogens and alkoxy radicals and a mono-silane having four hydrolyzable radicals selected from the class consisting of halogen and alkoxy radicals attached to each silicon atom, said monosilanes being in the molar proportions of at least two but not more than four of the former to one of the latter, hydrolyzing the mixture of said silanes, dehydrating the hydrolysis products, and recovering the liquid organo-siloxane thereby produced.

4. The method which comprises forming a mixture of silanes consisting of a mono-silane of the formula $(C_6H_5)(CH_3)_2SiX$ and a mono-silane of the formula $SiY_4$ where X and Y are hydrolyzable radicals selected from the class consisting of halogens and alkoxy radicals, said mono-silanes being in the molar proportions of at least 2 but not more than 4 of the former to 1 of the latter, hydrolyzing said mixture of silanes, dehydrating the hydrolysis products and recovering the liquid organo-siloxane thereby produced.

5. The method which comprises forming a mixture of silanes consisting of phenyldimethylethoxysilane and ethylorthosilicate in the molar ratio of from 2:3 to 4:1, hydrolyzing the mixture, and recovering the liquid organo-siloxane thereby produced.

6. The method which comprises forming a mixture of silanes consisting of phenyldimethylethoxysilane and ethylorthosilicate in the molar ratio of 4 to 1, hydrolyzing the mixture in the presence of hydrochloric acid, and recovering the liquid organo-siloxane thereby produced.

7. An organosiloxane consisting of siloxane units which correspond to the general formulae RR'R''SiO$_{1/2}$ and SiO$_2$, where R, R' and R'' are monovalent hydrocarbon radicals which are attached to the silicon through carbon-silicon linkages, in which organosiloxane there are at least 2 units of the type RR'R''SiO$_{1/2}$ per 3 units of the type SiO$_2$, but not more than 4 of the former per one of the latter, and in which organosiloxane all the valences of the silicon atoms other than those satisfied by the R, R' and R'' radicals are satisfied by the oxygen atoms of said units, which oxygen atoms are each bonded to two of said silicon atoms.

8. An organosiloxane as defined in claim 7, in which R is a phenyl radical and R' and R'' are methyl radicals.

9. An organosiloxane as defined in claim 7 in which R, R' and R'' are methyl radicals.

JAMES FRANKLIN HYDE.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,258,220 | Rochow | Oct. 7, 1941 |
| 2,258,222 | Rochow | Oct. 7, 1941 |
| 2,371,068 | Rochow | Mar. 6, 1945 |
| 2,412,470 | Norton | Dec. 10, 1946 |

OTHER REFERENCES

Meads et al., J. Chem. Soc. (London) 1914, pages 679 to 690.

Cuas et al., J. Chem. Soc. (London) 1932, pages 2205 to 2209.